(12) United States Patent
Bhogal et al.

(10) Patent No.: US 7,870,173 B2
(45) Date of Patent: Jan. 11, 2011

(54) STORING INFORMATION IN A COMMON INFORMATION STORE

(75) Inventors: Kulvir S. Bhogal, Fort Worth, TX (US); Gregory J. Boss, American Fork, UT (US); Alexandre Polozoff, Bloomington, IL (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 11/249,940

(22) Filed: Oct. 13, 2005

(65) Prior Publication Data

US 2007/0088771 A1    Apr. 19, 2007

(51) Int. Cl.
    *G06F 17/30*    (2006.01)
(52) U.S. Cl. ...................................... 707/827; 707/823
(58) Field of Classification Search ................ 719/328; 707/100, 8, 205, 827, 823, 707
    See application file for complete search history.

(56) References Cited

U.S. PATENT DOCUMENTS

| | | | |
|---|---|---|---|
| 6,665,679 B2 * | 12/2003 | Curtis et al. ................. | 707/100 |
| 6,801,992 B2 | 10/2004 | Gajjar et al. | |
| 6,895,467 B2 | 5/2005 | Lubbers et al. | |
| 7,057,770 B2 * | 6/2006 | Case .......................... | 358/1.9 |
| 7,174,334 B2 * | 2/2007 | Cherkasova .................. | 707/10 |
| 2004/0088538 A1 | 5/2004 | Isip et al. | |
| 2004/0088574 A1 | 5/2004 | Walter et al. | |
| 2004/0117369 A1 * | 6/2004 | Mandal et al. ................. | 707/8 |
| 2005/0091671 A1 * | 4/2005 | Deem et al. .................. | 719/328 |
| 2005/0097217 A1 * | 5/2005 | Val et al. ..................... | 709/233 |
| 2005/0125610 A1 | 6/2005 | Korgaonkar | |
| 2006/0101025 A1 * | 5/2006 | Tichy et al. .................. | 707/100 |
| 2006/0212430 A1 * | 9/2006 | Cohen et al. .................... | 707/3 |
| 2007/0005783 A1 * | 1/2007 | Saint-Hillaire et al. ....... | 709/230 |
| 2007/0250541 A1 * | 10/2007 | Takeda ....................... | 707/200 |

* cited by examiner

*Primary Examiner*—Mohammad Ali
*Assistant Examiner*—Donald Lawson
(74) *Attorney, Agent, or Firm*—Mark C. Vallone; Schubert Law Group PLLC

(57) ABSTRACT

Systems, methods and media for storing information in a common information store of a global file storage system are disclosed. Embodiments may include a common information store including a communications module to send and receive information to and from one or more servers in the global file storage system and a pattern database to store a plurality of subfiles for the global file storage system, where each subfile may include an indication of a recognizable pattern. The common information store may also include a common information store manager to analyze newly stored files and to reconstruct stored files of the global file storage system. In a further embodiment, the common information store manager may further comprise a pattern analyzer sub-module to analyze a file for recognizable patterns and to compare the recognizable patterns to the subfiles stored in the pattern database.

14 Claims, 9 Drawing Sheets

STORING INFORMATION IN A COMMON INFORMATION STORE

FIELD OF INVENTION

The present invention is in the field of data processing systems and, in particular, to systems, methods and media for storing information in a common information store, such as by storing common information to provide overall file compression in a storage infrastructure.

BACKGROUND

Information technology (IT) has become an integral part of most businesses, as accessing and managing information becomes more and more essential to compete in today's global marketplace. By having a robust IT infrastructure, a business can quickly and efficiently respond to customer demands and needs. Along with the increase in importance of IT, however, has come additional demand to store, maintain, and protect the data associated with a business, such as customer records, technical information or designs, or other business information. Storage of information, and proper backup of this information, has become an important challenge for IT managers. The proliferation of compression technologies (e.g., MP3, MPEG-4, DVI, etc.) and the explosion of data storage have fueled the rapid growth in storage capacity, causing IT or storage managers to look for ways to improve storage cost efficiencies.

Many companies, particularly larger companies or ones more dependent on their IT infrastructure, rely on a storage system that includes servers and storage devices connected with a local area network (LAN) or other network. Storage devices can include hard drive arrays, storage servers, RAID's (Redundant Array of Independent Disks), removable-medium storage devices (e.g., tape backup drives), or other devices to storage information. Information is then stored on one or more of the storage devices (depending on the level of safety required). Storage devices can be a very significant part of the cost of an IT infrastructure, particularly if information is duplicated on different devices to improve safety of the data. Accordingly, storage or IT managers typically desire to reduce the amount of storage necessary to meet the needs of the company's IT infrastructure and to thus improve storage cost efficiencies.

One common solution to the increase of data and the resulting increase in storage requirements is to compress the stored files, resulting in continually more advanced data compression techniques being developed to curb the growth in storage capacity. Current file compression techniques involve analyze a file or set of files for common patterns which can then be stored or referenced again multiple times so that with each subsequent reference to the stored pattern a significant amount of space is saved. With these technologies, a file or set of files that had more repeated data throughout could be compressed to a higher degree. Compression technologies such as WinRAR® by win.rar GmbH of Bremen, Germany (http://www.win-rar.com/) analyze several files at once and then apply compression over an entire fileset to provide a few percentage points of increased compression due to the larger data set with which the analysis can be made. This method has a number of disadvantages, such as the limitation that individual files cannot be decompressed without reading the entire compressed package resulting in slow extracts. Moreover, the file set must be stored as a single file and must be determined at compression time, prohibiting its use for subsequent compression sessions. There is, therefore, a need for an efficient and effective system to reduce the size of files in a storage system.

SUMMARY OF THE INVENTION

The problems identified above are in large part addressed by systems, methods and media for storing information in a common information store. Embodiments may include analyzing a file for recognizable patterns and comparing the recognizable patterns to subfiles stored in the common information store and parsing the file into one or more subfiles, where at least one subfile is associated with a recognizable pattern of the file that matches a subfile of the common information store. Embodiments may also include generating and storing subfile references for matching patterns. Further embodiments may also include storing subfiles not matching patterns in the common information store and generating and storing subfile references for the subfiles not matching patterns.

Another embodiment provides a machine-accessible medium containing instructions effective, when executing in a data processing system, to cause the system to perform a series of operations for storing information in a common information store. The series of operations generally includes analyzing a file for recognizable patterns and comparing the recognizable patterns to subfiles stored in the common information store and parsing the file into one or more subfiles, where at least one subfile is associated with a recognizable pattern of the file that matches a subfile of the common information store. The series of operations may also include generating and storing subfile references for matching patterns. Further embodiments of the series of operations may also include storing subfiles not matching patterns in the common information store and generating and storing subfile references for the subfiles not matching patterns.

A further embodiment provides a common information store of a global file storage system. Embodiments of the common information store may include a communications module to send and receive information to and from one or more servers in the global file storage system and a pattern database to store a plurality of subfiles for the global file storage system, where each subfile may include an indication of a recognizable pattern. The common information store may also include a common information store manager to analyze newly stored files and to reconstruct stored files of the global file storage system. In a further embodiment, the common information store manager may further comprise a pattern analyzer sub-module to analyze a file for recognizable patterns and to compare the recognizable patterns to the subfiles stored in the pattern database.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
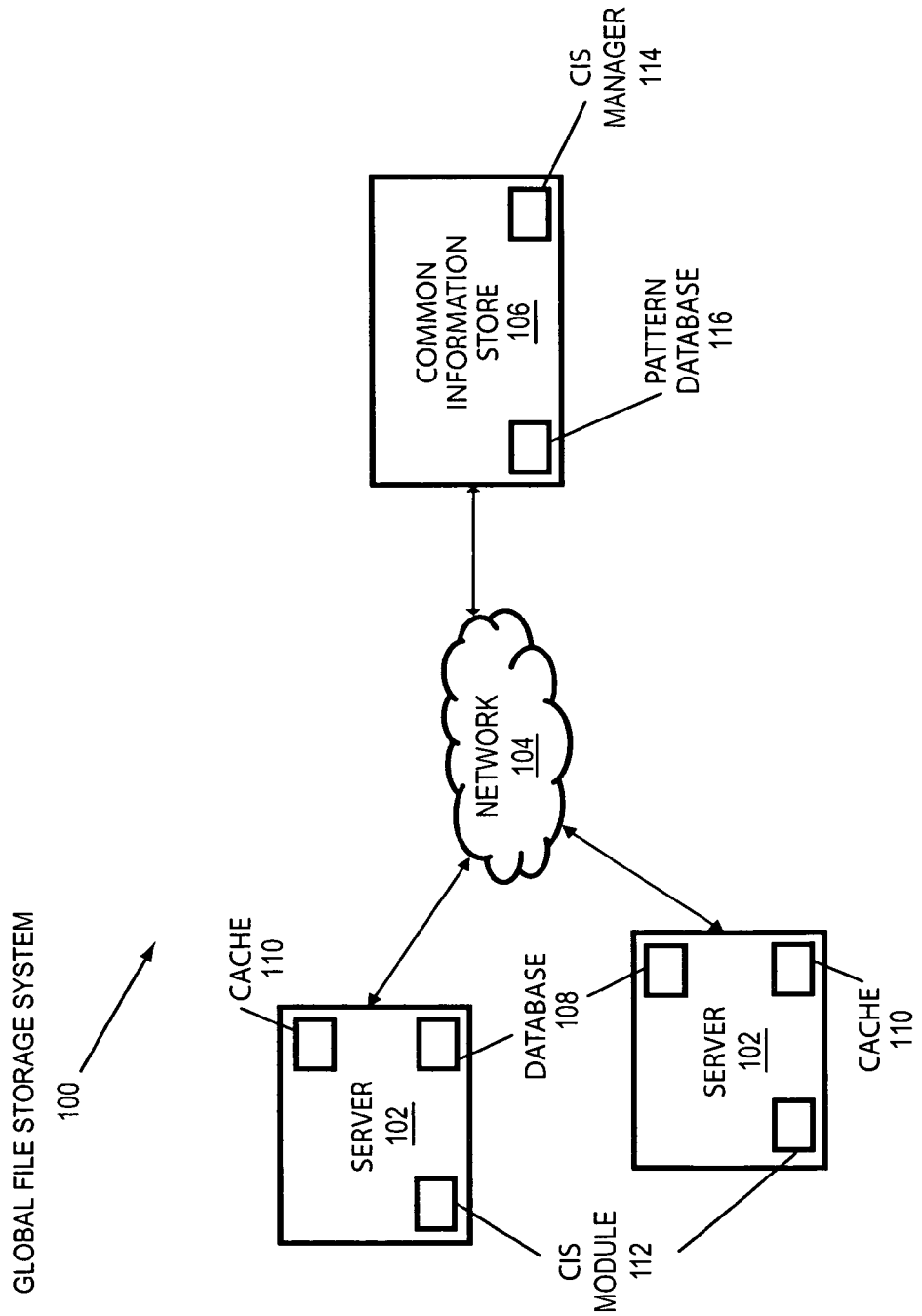
FIG. 1 depicts an environment for a global file storage system for storing information in a common information store according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for storing information in a common information store of a global file storage system are disclosed. Embodiments may include a common information store including a communications module to send and receive information to and from one or more servers in the global file storage system and a pattern database to store a plurality of subfiles for the global file storage system, where each subfile may include an indication of a recognizable pattern. The common information store may also include a common information store manager to analyze newly stored files and to reconstruct stored files of the global file storage system. In a further embodiment, the common information store manager may further comprise a pattern analyzer sub-module to analyze a file for recognizable patterns and to compare the recognizable patterns to the subfiles stored in the pattern database.

The system and methodology of the disclosed embodiments may reduce the saved file size for files stored in the global file storage system. The common information store may reference a pattern database when a server in the global file storage system newly stores a file and compare the newly stored file to the patterns in the pattern database. If recognizable patterns exist in the new file when compared to the pattern database, those patterns may be replaced with a negligible reference that points to a subfile in the pattern database associated with that pattern. By removing such content from a file and replacing it with a small reference, storage space for the file is advantageously reduced. Upon reconstruction of a file (such as when read access or write access is required), any references are replaced with the actual data from the pattern database during file reconstruction. The disclosed system may accomplish the savings in file sizes without having to utilize inefficient compression/decompression methodologies and may continually add or remove files from the global file storage system.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for a global file storage system for storing information in a common information store according to one embodiment. In the depicted embodiment, the global file storage system 100 includes a plurality of servers 102 in communication with a network 104. The global file storage system 100 may also include a common information store 106 in communication with network 104 for storing common information for servers 102. In the global file storage system 100, the servers 102 and the common information store 106 may be located at the same location, such as in the same building or computer lab, or could be remote. While the term "remote" is used with reference to the distance between the components of the global file storage system 100, the term is used in the sense of indicating separation of some sort, rather than in the sense of indicating a large physical distance between the systems. For example, any of the components of the global file storage system 100 may be physically adjacent or located as part of the same computer system in some network arrangements.

Servers 102 may be any computer systems that are utilized to store or access information and may be one or more personal computers, workstations, servers, mainframe computers, notebook or laptop computers, desktop computers, or the like. In some embodiments, the server 102 may be a computer system as described in relation to FIG. 2. An example server 102 is an International Business Machine Corporation (IBM) eServer® server. In one embodiment, the server 102 may include a database 108 and a cache 110. Database 108 may provide longer-term storage of information for server 102 and may be a hard drive (or array of hard drives) or similar storage device in some embodiments. As will be described in more detail subsequently, database 108 may include a plurality of file where some or all of the files may include references to subfiles within the common information store 106 instead of the full file, reducing the stored size of the file. Cache 110, as described in more detail subsequently, may provide temporary or short-term storage of information, such as during the reading or writing of files (and the associated reconstruction of the file for those purposes) stored in the common information store 106. Each server 102 may also include a common information store (CIS) module 112 for interfacing with the common information store 106, such as by transmitting or receiving subfiles to and from the common information store 106.

Network 104 may be any type of data communications channel, such as the Internet, an intranet, a local area network (LAN), a wide area network (WAN), an Ethernet network, a wireless network, a proprietary network, or a broadband cable network. In some embodiments, a global file storage system 100 implemented to assist data storage for a corporation may utilize a network 104 that is a corporate LAN or WAN. Those skilled in the art will recognize, however, that the invention described herein may be implemented utilizing any type of data communications channel.

The common information store 106 provides a centralized database of subfiles for a storage system to facilitate reduction in storage requirements for computer systems accessing the common information store 106, such as any servers 102. The common information store 106 may be implemented on one or more personal computers, workstations, servers, mainframe computers, notebook or laptop computers, desktop computers, or the like. In some embodiments, the common information store 106 may be executing on a computer system as described in relation to FIG. 2, such as an IBM eServer® or TotalStorage® Enterprise Storage Server® server. In other embodiments, the common information store 106 may be spread across multiple computer systems or servers 102 as part of a common filesystem or storage area network (SAN), such as IBM's TotalStorage® SAN. A SAN may be a sub-network of storage devices that is available to all servers 102 or other devices on a network 104 such as a LAN or WAN. While the common information store 106 and servers 102 are depicted in FIG. 1 as separate computer systems, they may also be part of the same computer system, such as a storage server with databases 108 and a common information store 106.

The common information store 106 may include a CIS manager 114 and a pattern database 116. The CIS manager 114 may interact with the CIS modules 112 of different servers 102 to facilitate storage of subfiles in the pattern database 116. The CIS manager 114 may also analyze files for recognizable patterns so that they may be reduced in size as well as reconstructing reduced files when filesystems operations require read, write, or other access to the file. The pattern database 116 may include a plurality of subfiles each representing a recognizable pattern from a file stored in the global file storage system 100. The CIS manager 114 may access the pattern database 116 when comparing files to existing subfiles or when reconstructing files using the saved subfiles. Patterns may be any type of data, such as a portion of a file stored in binary form. A recognizable pattern may be any portion of a data file that, when extracted from a full file, matches a portion of another file. A recognizable pattern may thus include a piece of content that is repeated more than once in the global file storage system 100, such as a copy of a document that is duplicated or a common portion of a file (such as part of a database) that multiple, distinct files share.

As will be described in more detail subsequently, the disclosed system may advantageously reduce the saved file size for files stored in the global file storage system 100. The CIS manager 114 may reference the pattern database 116 for newly stored files and if recognizable patterns exist in the new file when compared to the pattern database 116, that pattern may be replaced with a negligible reference that points to the pattern (in the form of a subfile) stored in the pattern database 116. Upon reconstruction of a file (such as when read access or write access is required), any references or pointers that are discovered are replaced with the actual data from the common information store 106 during file reconstruction. By taking advantage of storage virtualization-based technology enablers such as common filesystems, storage virtualization engines, and automated provisioning tools, the disclosed system may provide a global compression technique that utilizes similar data patterns across the global file storage system 100 to obviate the need for redundant data storage and capacity with a common information store 106. The disclosed system may accomplish the savings in file sizes without having to utilize inefficient compression/decompression methodologies and may continually add or remove files from the global file storage system 100. The disclosed system may be scaled based on the storage necessity, including being utilized with a single system (e.g., on a personal computer, server, storage server) or multiple networked systems (e.g., servers on a LAN, a SAN, etc.).

Figure 2:
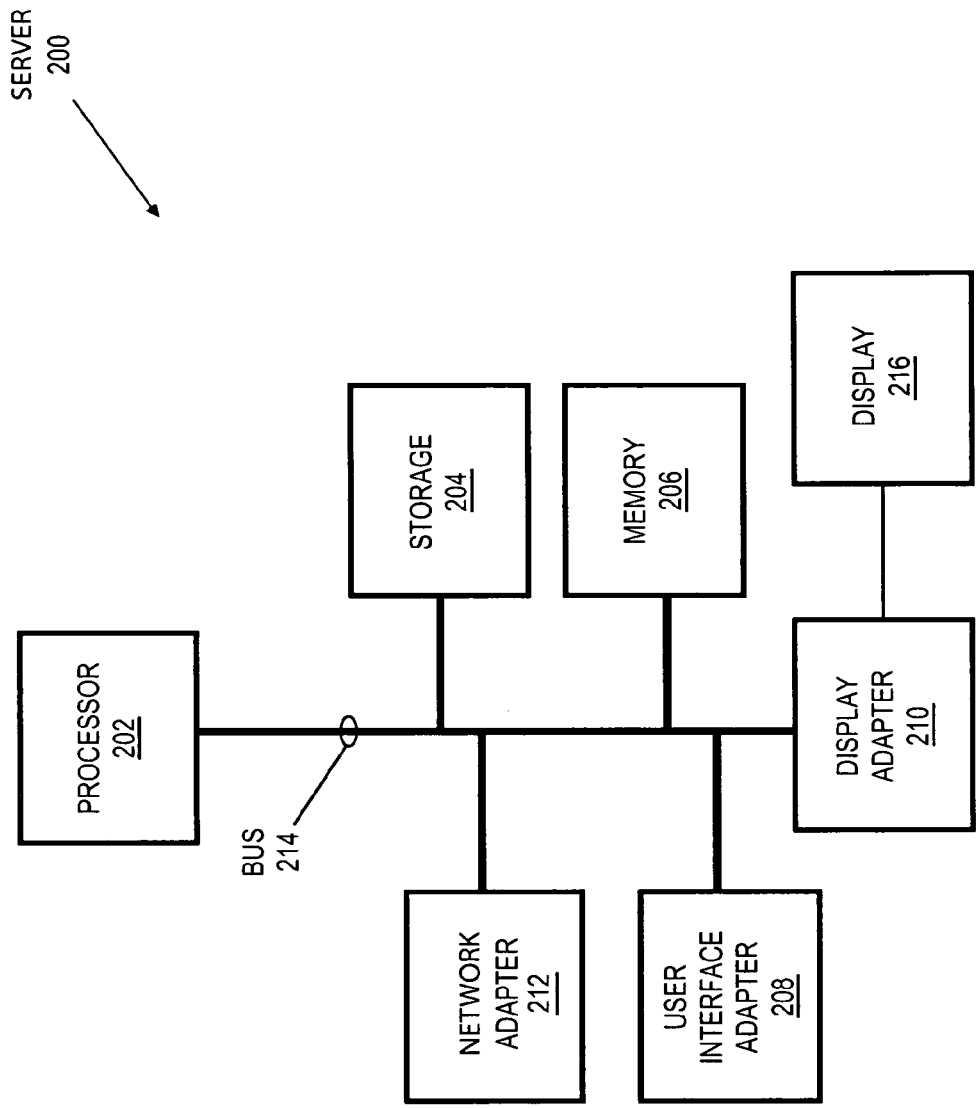
FIG. 2 depicts a block diagram of one embodiment of a computer system suitable for use as a component of the global file storage system, such as a server or common information store.

FIG. 2 depicts a block diagram of one embodiment of a computer system 200 suitable for use as a component of the global file storage system 100, such as a server 102 or common information store 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, a display adapter 210, and a network adapter 212 connected to a bus 214. The bus 214 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 214, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse, keyboard, touch pad, touch sensitive screens electronic pen, microphone, etc. The bus 214 may also connect the processor 202 to a display, such as an LCD display or CRT monitor, via the display adapter 210. The network adapter 212 may facilitate communication to and from network 104, and may be a LAN card or other network card in some embodiments.

Figure 3:
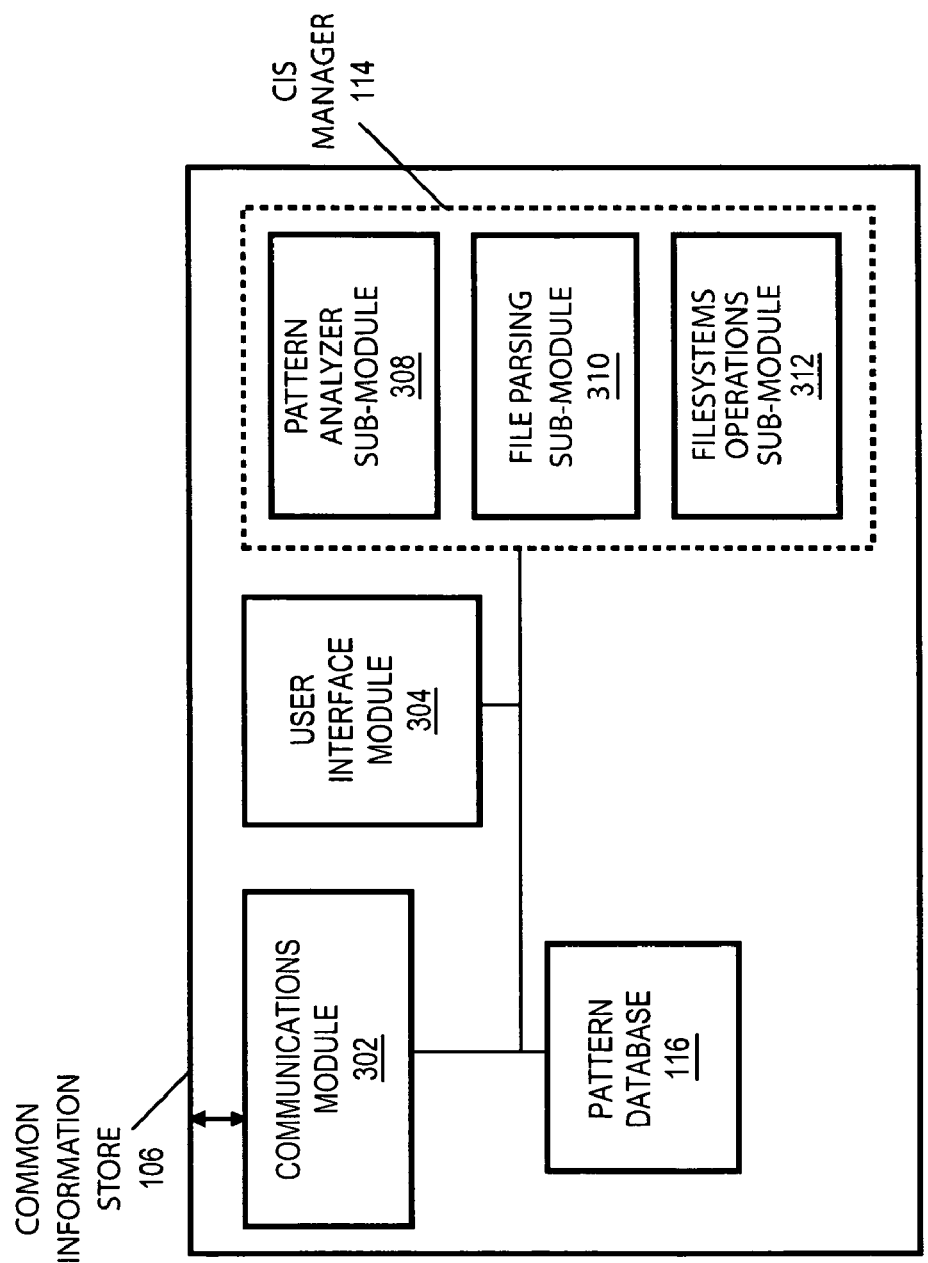
FIG. 3 depicts a conceptual illustration of software components of a common information store of a global file storage system of FIG. 1 according to one embodiment.

FIG. 3 depicts a conceptual illustration of software components of a common information store 106 of a global file storage system 100 of FIG. 1 according to one embodiment. The common information store 106 of the depicted embodiment includes a CIS manager 114, a pattern database 116, a communications module 302, and a user interface module 304. The common information store 106 may utilize the communications module 302 to facilitate communications to and from servers 102 via network 104. The user interface module 304 may receive user input from user input devices and may transmit an indication of the received input to other components of the common information store 106. The user interface module 304 may, through display adapter 210, also display information such as storage status information (e.g., efficiency of storage, storage space available, etc.) or other information to a storage manager or other administrator. Alternatively, the user interface module 304 may use audio, print, or other output in lieu of using a display 214 to provide output.

The CIS manager 114 may include sub-modules such as a pattern analyzer sub-module 308, a file parsing sub-module 310, and a filesystems operations module 312. The pattern analyzer sub-module 308 may analyze a file provided by a server 102 that is intended to be saved as part of the global file storage system 100 in order to determine whether there are any recognizable patterns in the file that match stored patterns (in subfiles) in the patterns database 116. If any parts of the file do include recognizable patterns that match subfiles in the pattern database 116, the file parsing sub-module 310 may parse the file into subfiles based on the matches. The file parsing sub-module 310 may, for example, extract out parts of the file that match stored subfiles, leaving the remainder of unique information as one or more subfiles. Extracted subfiles may be replaced with a reference to the appropriate subfile of the pattern database 116, reducing the storage space necessary for the file. In some embodiments, the file to be stored is completely parsed into subfiles and any unique parts of the file may be saved in the pattern database 116 as new subfiles. In other embodiments, only matching subfiles are removed from a file and the remainder of the file (along with the appropriate references) is stored at the server 102. The filesystems operations sub-module 312 may handle any read access, write access or other filesystems operation requests from the servers 102, such as by reconstructing a file when a server 102 is requesting read access of the file. The operation of the filesystems operations sub-module is described in more detail in relation to FIGS. 7-9.

Figure 4:
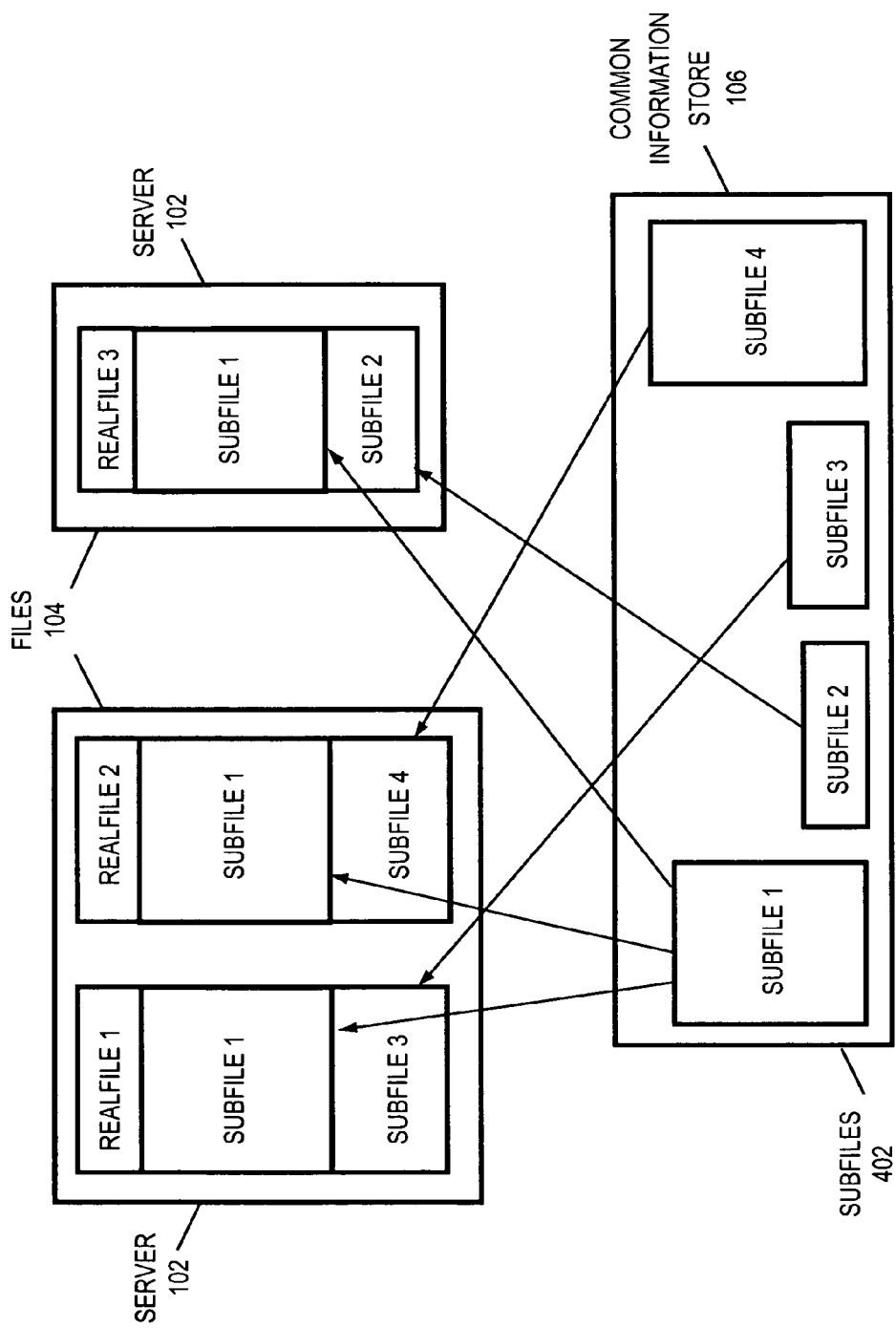
FIG. 4 depicts a logical representation of the disclosed methodology of storing subfiles in a common information store.

FIG. 4 depicts a logical representation of the disclosed methodology of storing subfiles in a common information store. As will be described in more detail in relation to FIGS. 5-6, a plurality of subfiles 402 (e.g., subfile1, subfile2, subfile3, and subfile 4) may be stored in the common information store 106 and a plurality of files 404 (e.g., realfile1, realfile2, and realfile3) may be stored in one or more servers 102. The arrows of FIG. 4 represent a relationship between a file 404 and a subfile 402 of the common information store 106. For example, 'realfile1' includes the content of 'subfile1' and 'subfile3' (i.e., it contains references for those subfiles). Accordingly, the entire contents of 'realfile1' need not be stored and only references to its two constituent subfiles need be stored. Similarly, 'realfile2' may contain references to 'subfile1' and 'subfile4' and 'realfile3' may contain references to 'subfile1' and 'subfile3'. When a new file 404 is created, only the unique portions need be saved and references to subfiles 402 within the common information store 106 suffice for the non-unique part of the files' 404 content. The subfiles 402 by themselves are useless but may be advantageously combined with other subfiles 402 or other content to create useable files 404.

The efficiencies gained from the disclosed systems and methodologies may be seen with the subfile 'subfile1', as only one copy of 'subfile1' needs be stored and all three files 404 reference it. Instead of three duplicative copies of that content needing to be stored at various places in a storage infrastructure, only one copy (plus two relatively negligible references to the file) need be stored instead. As additional files 404 are added, more efficiency may be gained as there will be more commonalities (i.e., matching patterns) between files 404 and the storage efficiency may advantageously increase.

Figure 5:
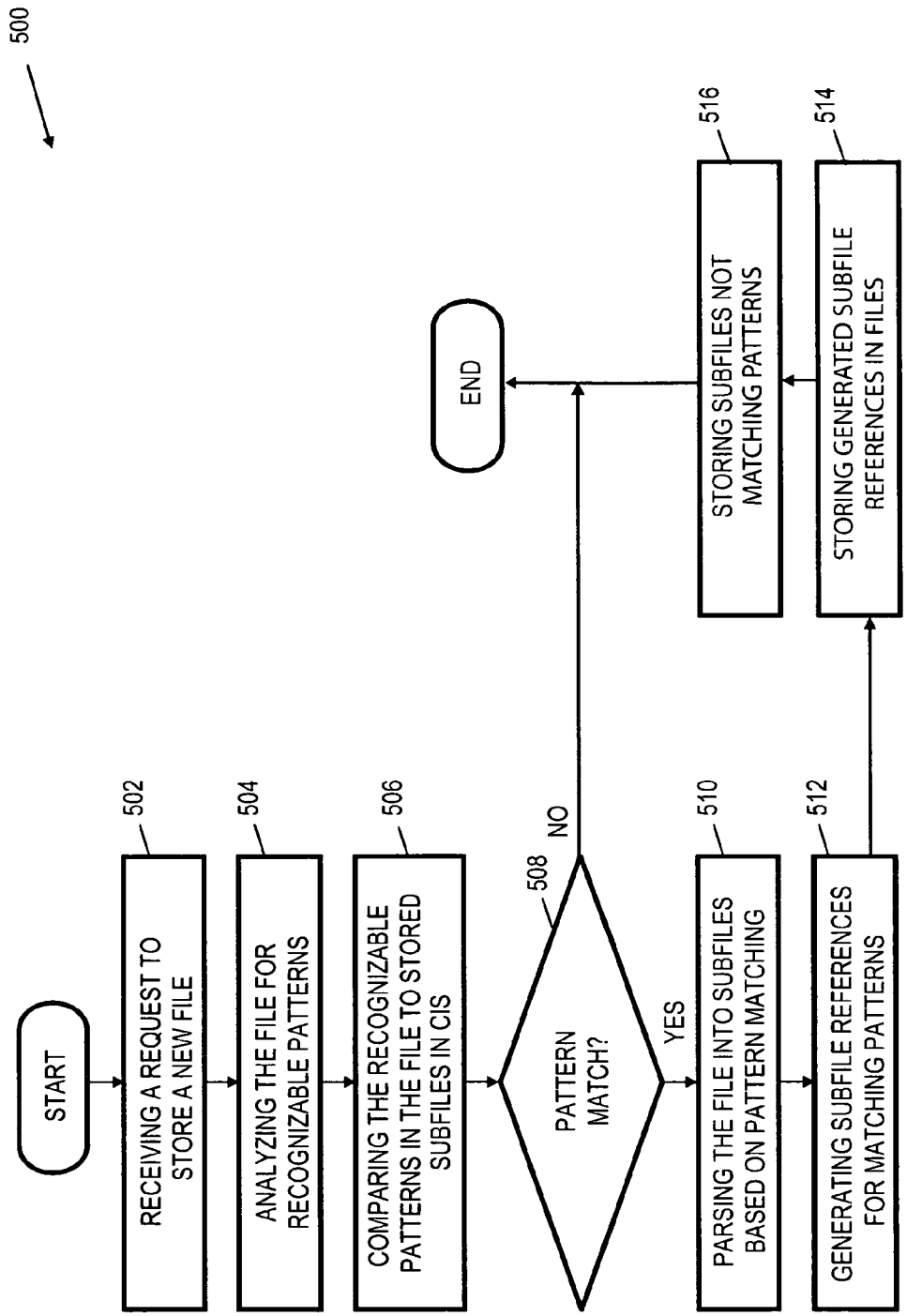
FIG. 5 depicts an example of a flow chart for analyzing and parsing a file for storage according to one embodiment.

FIG. 5 depicts an example of a flow chart 500 for analyzing and parsing a file for storage according to one embodiment. The method of flow chart 500 may be performed, in one embodiment, by a common information store 106 with a CIS manager 114. Flow chart 500 begins with element 502, where the common information store 106 may receive a request to store a new file from the CIS module 112 of a server 102. The pattern analyzer sub-module 308 may next, at element 504, analyze the file for recognizable patterns and, at element 506, compare the found patterns to patterns represented in subfiles of the pattern database 116 in the common information store 106. If the pattern analyzer sub-module 308 does not find a match at decision block 508, the method may terminate, and if the pattern analyzer sub-module 308 does find a match, the method of flow chart 500 may continue to element 510 for parsing.

The file parsing sub-module 310 may, at element 510, parse the file into subfiles based on the results of the pattern matching at element 506. The file parsing sub-module 310 may parse the file into one or more subfiles associated with the common information store 106, one or more unique subfiles with patterns not found in the common information store, or a combination of both. A file with no unique content from the common information store 106 may accordingly be parsed into one or more subfiles associated with subfiles in the pattern database 116, for example, while a file with some unique content may be parsed into one subfile for the unique content but other subfiles for the matching patterns, in another example. At element 512, the file parsing sub-module 310 may generate subfile references to the pattern database 116 for any subfiles associated with matching patterns. The file parsing sub-module 310 may store the generated references at element 514 and may also store any subfiles not associated with matching patterns (i.e., associated with unique content) at element 516. In one embodiment, the file parsing sub-module 310 may store the generated references and any unique subfiles as part of one file. The resulting file may be smaller than if the disclosed methodology had not been used, as subfile references will be smaller than the content they replace in almost all circumstances. The file may be stored at the server 102 requesting the file be saved in some embodiments, resulting in the file parsing sub-module 310 transmitting the file to the server 102 for storage. One skilled in the art will recognize that other methodologies for storing the generated subfile references and subfiles are possible, including storing some or all in different locations. After storing the file, the method of flow chart 500 may terminate.

Figure 6:
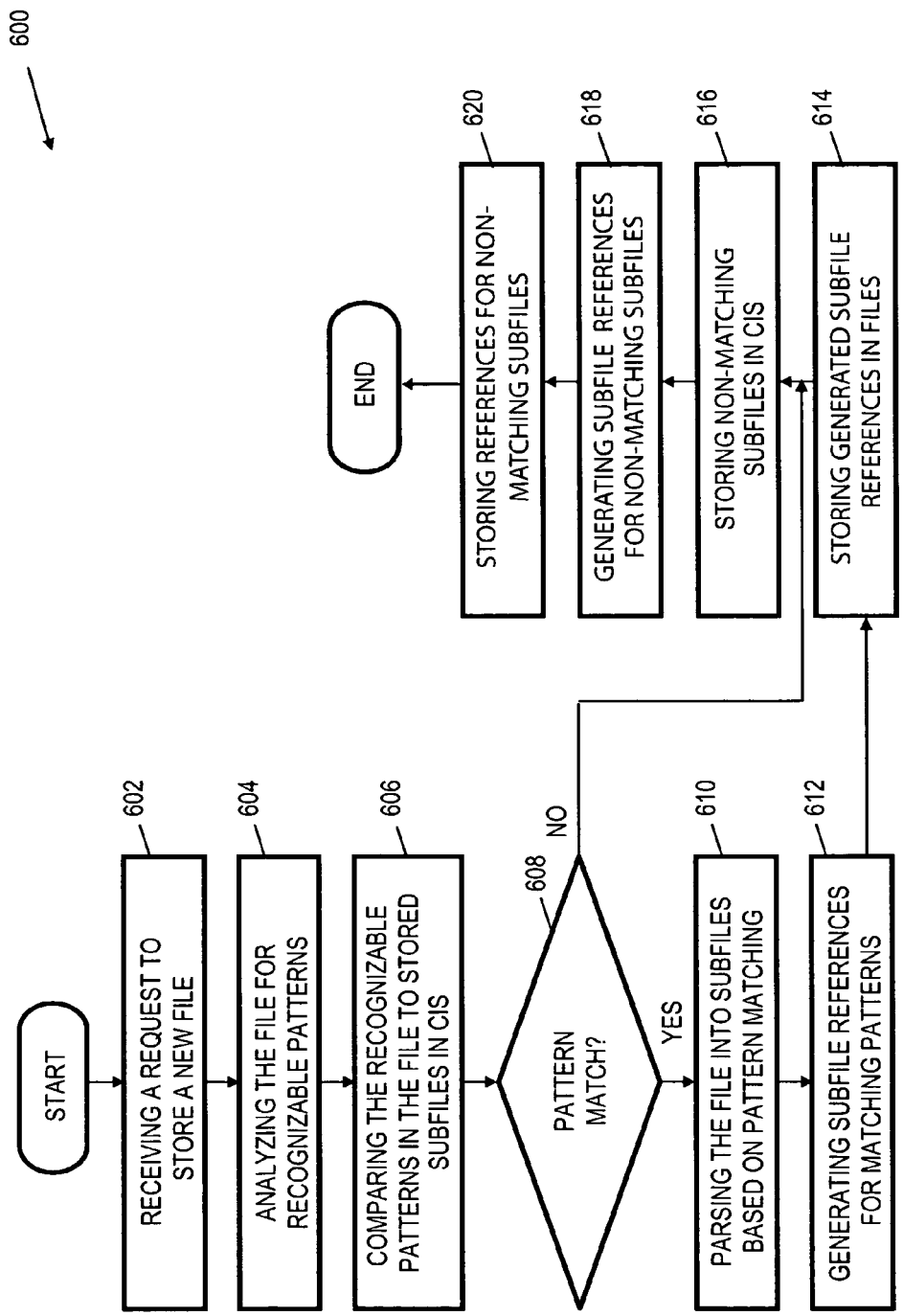
FIG. 6 depicts an example of a flow chart for analyzing and parsing a file for storage according to a second embodiment.

FIG. 6 depicts an example of a flow chart 600 for analyzing and parsing a file for storage according to a second embodiment. The method of flow chart 600 may be utilized in embodiments where unique parts of a file are added to the common information store 106 instead of saved as subfiles, as in the method of flow chart 500. The method of flow chart 600 may be particularly useful when the common information store 106 is relatively sparsely populated with respect to subfiles. The method of flow chart 600 may be performed, in one embodiment, by a common information store 106 with a CIS manager 114. Elements 602, 604, 606, 608, 610, 612, and 614 of flow chart 600 may be substantially similar to elements 502, 504, 506, 508, 510, 512 and 514 of flow chart 500, respectively, and the description will not be repeated in the interest of brevity. At decision block 608, however, if the pattern analyzer sub-module 308 does not find a match between patterns in the file to subfiles in the common information store 106, the method continues to element 616 for to add the file to the common information store 106 instead of terminating as in flow chart 500.

After parsing the file, generating subfile references for matching patterns, and storing the generated references (if an affirmative response at decision block 608 was achieved), the method of flow chart 600 may continue to element 616, the pattern analyzer sub-module 308 may store any non-matching subfiles in the common information store 106. The pattern analyzer sub-module 308 may then generate subfile references for the non-matching subfiles at element 618 and may store those references in the file at element 620, after which the function terminates. The method of flow chart 600 may therefore store substantially all of the information from a file in the common information store 106, leaving only references to subfiles in the 'file' at the server 102. When compared to the method of flow chart 500, the method of flow chart 600 results in smaller file sizes at the server 102 but may result in additional processing time during filesystems operations.

Figure 7:
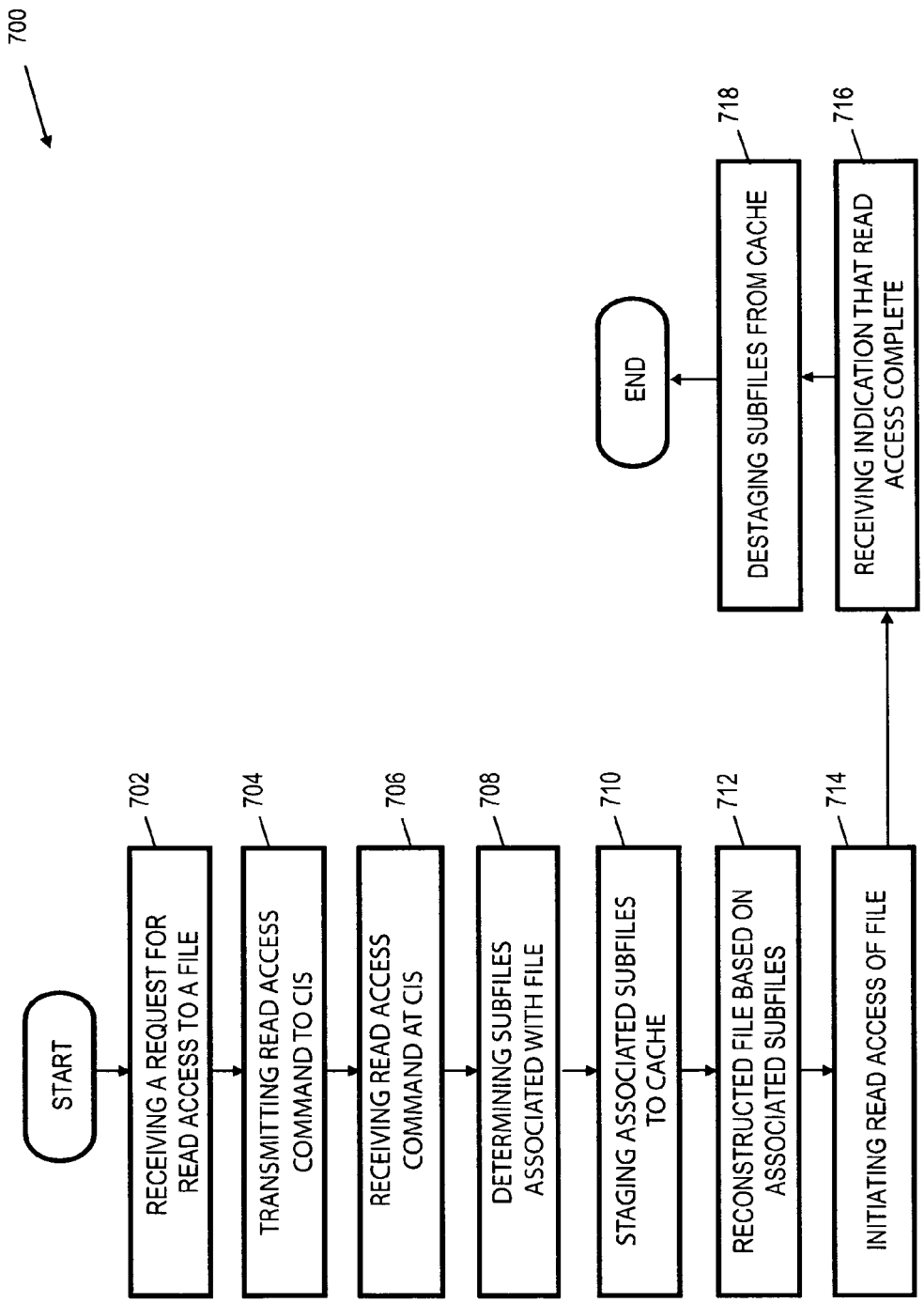
FIG. 7 depicts an example of a flow chart for providing reconstructing a file and providing read access to the file according to one embodiment.

FIG. 7 depicts an example of a flow chart 700 for providing reconstructing a file and providing read access to the file according to one embodiment. Flow chart 700 begins with element 702, where the server 102 may receive a request for read access to a particular file in the global file storage system 100. The server 102 may receive the request from, for example, an application of the server 102 seeking authorization to read the file. Alternatively, the server 102 may determine that read access to the file is required without receiving a specific request from an application or other source. As the copy of the file on the server 102 will not be complete, having references to one or more subfiles in place of some content, the server 102 may transmit a read access command to the common information store 106 at element 704.

The common information store 106 may receive the read access command at element 706, after which the filesystems operation sub-module 312 of the common information store 106 may determine, at element 708, which subfile(s) in the pattern database 116 are associated with the file for which read access is sought. The filesystems operation sub-module 312 may then optionally stage the associated subfiles to the cache 110 of the server 102 or otherwise provide the subfiles to the server 102 at element 710. The subfiles may be cached, for example, in server memory or a storage virtualization layer. Once the server 102 has received the subfiles in its cache 110, the CIS module 112 of the server may at element 712 reconstruct or reconstitute the file by replacing the subfile references with the subfiles from the cache 110. By using the disclosed methodology, the entire original file may be advantageously recreated by replacing the subfile references with the appropriate subfiles.

Once the file has been reconstructed, the server 102 may then allow the read access of the file to be initiated at element 714. The server 102 may next at element 716 optionally receive an indication that the read access is complete. Alternatively, the server 102 may instead make a determination that read access is likely complete after a specified period of time. Once read access is complete, either the server 102 or the common information store 106 may at element 718 destage the subfiles from the cache 110 to free up cache memory for future filesystem operations, after which the method of flow chart 700 terminates.

Figure 8:
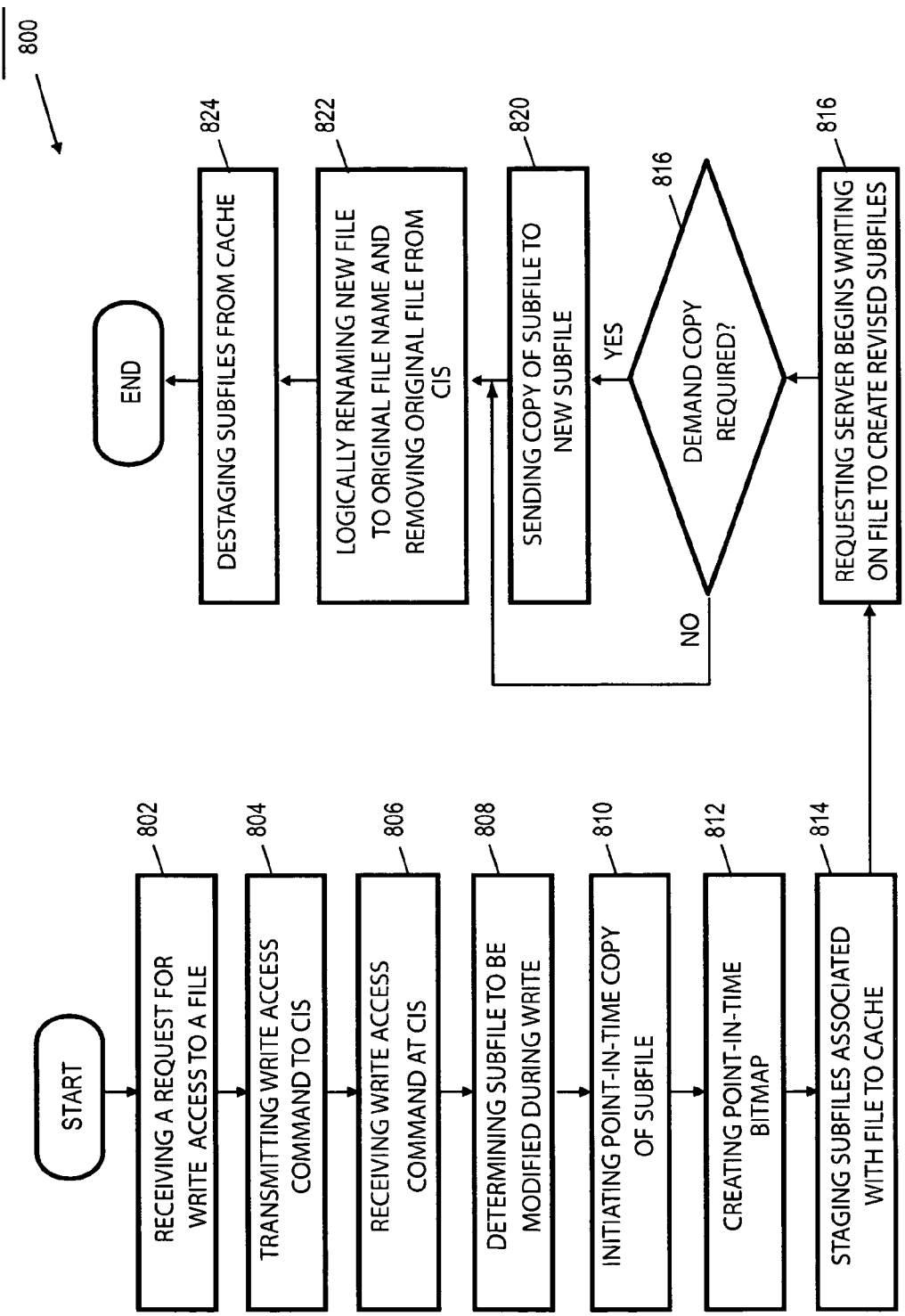
FIG. 8 depicts an example of a flow chart for providing write access to a file according to one embodiment.

FIG. 8 depicts an example of a flow chart 800 for providing write access to a file according to one embodiment. Flow chart 800 begins with element 802, where the server 102 may receive a request for write access to a particular file in the global file storage system 100. The server 102 may receive the request from, for example, an application of the server 102 seeking authorization to read the file. Alternatively, the server 102 may determine that write access to the file is required without receiving a specific request from an application or other source. As the contents of the file may actually be located in subfiles at the common information store 106, the server 102 may then transmit a write access command to the common information store 106 at element 804.

The common information store 106 may receive the write access command at element 806, after which the filesystems operation sub-module 312 of the common information store 106 may determine, at element 808, which subfile(s) in the pattern database 116 are associated with the file for which write access is sought. The filesystems operation sub-module 312 may then initiate a point-in-time copy of the subfile(s) to be modified at element 810 and create a point-in-time bitmap of the subfile at element 812. The filesystems operation sub-module 312 may create the point-in-time copy in the pattern database 116 of the common information store 106. A point-in-file copy is a non-destructive backup technique that creates a fully usable copy of a defined collection of data that contains an image of the data as it appeared at a single point-in-time. An example point-in-file copy application is IBM®'s TotalStorage® Resiliency Family FlashCopy® application for providing point-in-time copy capability for logical volumes.

Once a point-in-time copy of the subfiles to be modified has been created, the filesystems operation sub-module 312 may stage the subfiles to the cache 110 of the server 102 or otherwise provide the subfiles to the server 102 at element 814. The subfiles may be cached, for example, in server memory or a storage virtualization layer. Once the server 102 has received the subfiles in its cache 110, the server 102 (or an application of the server 102) may begin writing on the file to create one or more new, revised subfiles. The server 102 may reconstruct the file (as described in relation to element 712 of FIG. 7) before beginning writing in some embodiments. As writing to the file continues, future writes are sent to the new subfile(s). If the filesystems operation sub-module 312 determines at decision block 818 that a demand copy is required, the filesystems operation sub-module 312 may send the demand copy of the unmodified subfile to the modified subfile before the write updates any blocks.

After write access is complete, the server 102 at element 822 may logically rename the new file to the original file name and remove the original file from the common information store 106. Once the original file is removed, either the server 102 or the common information store 106 may at element 824 destage the subfiles from the cache 110 to free up cache memory for future filesystem operations, after which the method of flow chart 800 terminates. By using the disclosed methodology, a server 102 may write to a file of a common information store 106 while other servers 102 still have access to the unmodified content.

Figure 9:
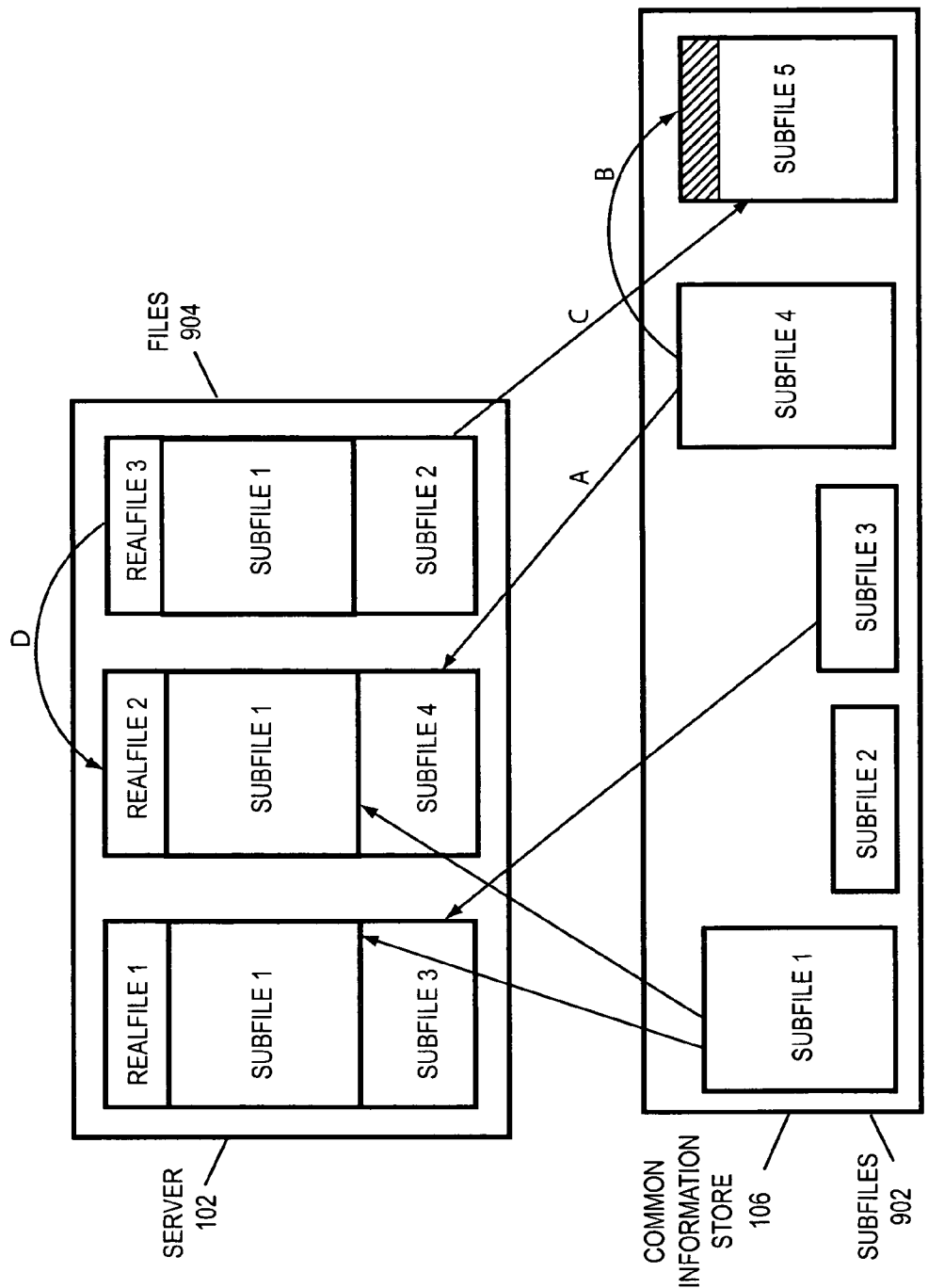
FIG. 9 depicts a logical representation of the methodology of FIG. 8 for writing to subfiles in a common information store.

FIG. 9 depicts a logical representation of the methodology of FIG. 8 for writing to subfiles in a common information store. The common information store 106 contains a plurality of subfiles 902 (e.g., subfile1, subfile2, subfile3, and subfile 4) and server 102 contains a plurality of files 404 (e.g., realfile1, realfile2, and realfile3). The straight arrows of FIG. 9 represent a relationship between a file 904 and a subfile 902 of the common information store 106. In the depicted embodiment, an application may wish to modify the content of 'realfile2' and, in particular, the content of 'subfile4' as part of 'realfile2'. Arrow 'A' represents the relationship between the stored 'subfile4' in the common information store 106 and the subfile reference stored in 'realfile2'. As 'subfile4' will be modified, but other applications or servers 102 may need access to 'subfile4', a point-in-time copy of 'subfile4' is generated. Arrow 'B' represents the point-in-time copy of 'subfile4' that results in 'subfile5'. Arrow 'B' may correspond to elements 810 and 812 of flow chart 800 of FIG. 8.

As server 102 begins writing on 'realfile2', which effectively becomes 'realfile3', the writes are sent to 'subfile5' of the common information store 106 as show with arrow 'C' (and as described in relation to element 816 of flow chart 800). In the depicted embodiment, content is removed from 'subfile5' as compared to 'subfile4'. Once the write access has been completed, 'realfile3' is logically renamed to 'realfile2' as shown by arrow 'D' and the original and outdated 'realfile2' is removed from the common information store 106, as described in relation to element 822 of flow chart 800. Using the disclosed methodology, a server 102 may therefore write to a file of the common information store 106 while the integrity of the original file, or its component subfiles, is maintained for other servers 102.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for storing information in a common information store. It is understood that the form of the invention shown and described in the detailed description and the drawings are to be taken merely as examples. It is intended that the following claims be interpreted broadly to embrace all the variations of the example embodiments disclosed.

What is claimed is:

1. A method for storing information in a common information store, the method comprising:
   receiving, by a common information store that is part of a global file storage system and executing on one or more computer systems, a request from one of a plurality of servers of the global file storage system to store a file in the global file storage system, the common information store having a pattern database storing a plurality of subfiles each containing an indication of a recognizable pattern associated with one or more files stored in the global file storage system;
   analyzing by the common information store the requested file to be stored for recognizable patterns and comparing the recognizable patterns to subfiles stored in the pattern database of the common information store;
   parsing by the common information store the file into one or more subfiles, wherein at least one subfile is associated with a recognizable pattern of the file that matches a subfile in the pattern database of the common information store and at least one subfile does not match a recognizable pattern in the pattern database of the common information store; and
   generating by the common information store subfile references for subfiles having matching patterns; and
   storing by the common information store the requested file in the global file storage system by storing both the subfile references for subfiles having matching patterns and the at least one subfile not having a matching pattern.

2. The method of claim 1, further comprising:
   storing by the common information store subfiles not matching patterns in the pattern database of the common information store; and
   generating and storing by the common information store subfile references for the subfiles not matching patterns.

3. The method of claim 1, further comprising:
   determining by the common information store one or more subfiles in the pattern database of the common information store associated with the file;
   staging by the common information store the associated subfiles to a cache; and
   reconstructing by the common information store the file based on the associated subfiles.

4. The method of claim 1, further comprising:
   determining by the common information store one or more subfiles of an original file to be modified in a write;
   creating by the common information store a point-in-time bitmap of the subfiles to be modified;
   staging by the common information store the subfiles to be modified to a cache and writing to the subfiles; and
   logically by the common information store renaming a new file based on the subfiles in the cache to the original file.

5. The method of claim 1, wherein storing subfile references for matching patterns comprises storing subfile references for matching patterns in the file.

6. A machine-accessible medium of a storage device containing instructions effective, when executing in a data processing system, to cause said data processing system to perform operations comprising:
   receiving, by a common information store that is part of a global file storage system and executing on one or more computer systems, a request from one of a plurality of servers of the global file storage system to store a file in the global file storage system, the common information store having a pattern database storing a plurality of subfiles each containing an indication of a recognizable pattern associated with one or more files stored in the global file storage system;
   analyzing by the common information store the requested file to be stored for recognizable patterns and comparing the recognizable patterns to subfiles stored in the pattern database of the common information store;
   parsing by the common information store the file into one or more subfiles, wherein at least one subfile is associated with a recognizable pattern of the file that matches a subfile in the pattern database of the common information store and at least one subfile does not match a recognizable pattern in the pattern database of the common information store; and
   generating by the common information store subfile references for subfiles having matching patterns; and
   storing by the common information store the requested file in the global file storage system by storing both the subfile references for subfiles having matching patterns and the at least one subfile not having a matching pattern.

7. The machine-accessible medium of claim 6, further comprising:
   storing by the common information store subfiles not matching patterns in the pattern database of the common information store; and
   generating and storing by the common information store subfile references for the subfiles not matching patterns.

8. The machine-accessible medium of claim 6, further comprising:
   determining by the common information store one or more subfiles in the pattern database of the common information store associated with the file;
   staging by the common information store the associated subfiles to a cache; and
   reconstructing by the common information store the file based on the associated subfiles.

9. The machine-accessible medium of claim 6, further comprising:
   determining by the common information store one or more subfiles of an original file to be modified in a write;

creating by the common information store a point-in-time bitmap of the subfiles to be modified;

staging by the common information store the subfiles to be modified to a cache and writing to the subfiles; and logically by the common information store renaming a new file based on the subfiles in the cache to the original file.

10. The machine-accessible medium of claim 6, wherein storing subfile references for matching patterns comprises storing subfile references for matching patterns in the file.

11. A common information store of a global file storage system, the common information store comprising:

a communications module to send and receive information to and from one or more servers in the global file storage system, the communications module receiving requests from the one or more servers to store a file in the common information store of the global file storage system;

a pattern database to store a plurality of subfiles for the global file storage system, each subfile comprising an indication of a recognizable pattern associated with one or more files stored in the global file storage system; and a common information store manager in communication with the pattern database and the communications module to analyze newly stored files and to reconstruct stored files of the global file storage system the common information store manager comprising:

a pattern analyzer sub-module to analyze a file for recognizable patterns and to compare the recognizable patterns to the subfiles stored in the pattern database; and a file parsing sub-module to parse a file into one or more subfiles, wherein at least one subfile is associated with a recognizable pattern of the file that matches a subfile in the pattern database and at least one subfile does not match a recognizable pattern in the pattern database, and wherein further the file parsing sub-module generates subfile references for subfiles having matching patterns and stores the requested file by storing both the subfile references for subfiles having matching patterns and the at least one subfile not having a matching pattern.

12. The system of claim 11, wherein the common information store executes on one or more servers.

13. The system of claim 11, wherein the common information store manager further comprises a filesystems operations sub-module to provide filesystems operations access to files of the global file information system.

14. The system of claim 11, wherein the common information store manager further comprises a filesystems operations sub-module to provide read access to a file by reconstructing the file based on subfiles of the pattern database associated with the file.

* * * * *